United States Patent Office 3,238,205
Patented Mar. 1, 1966

3,238,205
TRIAZINYL-SILOXANE COMPOUNDS
James Alastair Crichton Watt, Fairlie, Scotland, assignor to Imperial Chemical Industries Limited, London, England, a corporation of Great Britain
No Drawing. Filed Feb. 11, 1963, Ser. No. 257,771
Claims priority, application Great Britain, Feb. 19, 1962, 6,294/62
9 Claims. (Cl. 260—249.5)

This invention relates to new and useful compositions and to the use thereof and more particularly to new and useful organosilicon compositions and use of these for the treatment of fibrous materials.

A wide variety of organosilicon compositions are readily available and are widely used because of their many useful and advantageous properties. Included among these are many suitable for and used in the treatment of fibrous materials, for example, to render these water repellent or stain resistant. Many of these materials, however, are not entirely satisfactory because the effect of the treatment is not sufficiently permanent, for example, to washing or dry cleaning.

An object of the present invention is to provide new and useful organosilicon compositions. Another object is to provide such compositions which can be used for the treatment of fibrous material. A further object is to provide a process for the treatment of fibrous materials which will confer improved effects thereon. Other objects will appear hereinafter.

According to the present invention these objects are accomplished by an organosilicon composition comprising one or more organosilicon compounds of the general formula

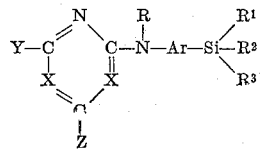

where R is H, an alkyl group containing not more than 6 carbon atoms or an aryl group, X is N, CH, CCl or C(CN), Y and Z, which may be the same or different, are Cl, Br, I, OR' where R' is an alkyl, aryl or alkenyl group having not more than 6 carbon atoms, an $NR_2''$ group where R'' is H or an alkyl or alkenyl group having not more than 6 carbon atoms or

Ar is a phenylene group or a substituted phenylene group, $R^1$ is a triorganosilylorganosiloxanyl group and $R^2$ and $R^3$ which may be the same or different, are alkyl groups, aryl groups or triorganosilylorganosiloxanyl groups.

The group R may be selected from hydrogen, alkyl groups containing not more than 6 carbon atoms such as methyl, ethyl, propyl and butyl groups and aryl groups such as phenyl groups and substituted phenyl groups. It is however in general preferred that R should be hydrogen or a methyl group.

The group X may be selected from N, CH, CCl and C(CN) as already stated. In general, it is however, preferred that X should in at least one occurrence be nitrogen and in the second occurrence be C(CN) or nitrogen. It is further preferred that X should be nitrogen in both occurrences.

Y and Z may be the same or different and may be a halogen such as chlorine, bromine or iodine, an OR' group such as a methoxy ethoxy or allyloxy group, an $NR''_2$ group such as an amino group, a methyl amino group or a dimethyl amino group or

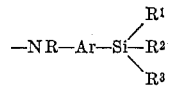

It is however normally preferred that Y and Z should either be two chlorine atoms or one chlorine atom and one methoxy group.

The Ar group may be a phenylene group such as a meta-phenylene group or a para-phenylene group or may be a substituted phenylene group such as a methyl substituted, nitro substituted or amino substituted phenylene group. It is however normally preferred that it should be an unsubstituted phenylene group and it is further preferred that it should be a meta-phenylene group.

$R^1$ may be a triorganosilylorganosiloxanyl group such as a dimethyl, methylhydrogen, methylphenyl or methylvinyl siloxanyl group end stopped with a triorganosilyl group such as a trimethylsilyl group, a dimethylhydrogensilyl group, a dimethylphenylsilyl group or a group derived therefrom by substitution.

$R^2$ and $R^3$, which may be the same or different, may be alkyl groups such as methyl or ethyl groups, aryl groups such as phenyl groups, alkenyl groups such as vinyl groups or triorganosilylorganosiloxanyl groups such as are described in the preceding paragraph for $R^1$. It is however for many purposes preferred that $R^2$ and $R^3$ should be the same and that they should be methyl groups.

Also included within the compounds of my invention are those in which the group $R^1$ includes either as a terminal group or attached to a silicon atom at an intermediate position, a second substituted phenyl group of the kind characterising my invention.

The compounds of my invention may be prepared by reacting a suitable halogen containing heterocyclic compound with an organopolysiloxane having at least one aminoarylsilyl group. Organopolysiloxanes having an aminoarylsilyl group therein can easily be prepared by the cohydrolysis and cocondensation of an aminoaryl-halo or aminoarylalkoxy-silane with one or more other hydrolysable silanes. Alternatively they can be prepared by the nitration and subsequent reduction of a phenyl substituted siloxane followed by, if necessary, equilibration with a diorganopolysiloxane such as a dimethylpolysiloxane of suitable chain length. The other organo groups in the organopolysiloxane containing at least one aminoarylsilyl group may of course vary widely, e.g. they may be alkyl groups such as methyl or ethyl groups, aryl groups such as phenyl groups or alkenyl groups such as vinyl or allyl groups. There may also be if desired a proportion of hydrogen atoms directly attached to silicon atoms. Organopolysiloxanes in which the other groups are methyl groups are however in general preferred. The ratio of organo groups to silicon atoms in the organopolysiloxane preferably varies from 1.9:1 to 3:1. Suitable halogen containing heterocyclic compounds which may be reacted with the aminoarylpolysiloxane include, for example, cyanuric chloride, cyanuric bromide, 2,4,6-trichloro-5-cyanopyrimidine and 2,4-dichloro-6-methoxytriazine.

Characterising groups which may be present in the compound of our invention include 2,4-dichlorotriazinylaminophenylsiloxy groups, 2-chloro-4-methoxytriazinylaminophenylsiloxy groups, 2,4-dimethoxytriazinylaminophenylsiloxy groups, 2,4-dichloropyrimidinylaminophenylsiloxy groups, 2,4,5-trichloropyrimidinylaminophenylsiloxy groups, 2,4-dichloro-5-cyanopyrimidinylaminophenlysiloxy groups, 2,4-dichlorotriazinylbutylaminophenylsiloxy groups, and 2-chloro-4-aminotriazinylaminophenylsiloxy groups. For many purposes materials containing 2,4-dichlorotriazinylaminophenylsiloxy groups are preferred, while for certain other purposes, for example, where great stability in emulsion form is desired materials containing 2-chloro-4-methoxytriazinylaminophenylsiloxy groups are preferred.

In the preferred method of manufacturing the products of our invention a low molecular weight siloxane containing at least one phenyl group is first nitrated and the nitration product then reduced. The so obtained aminophenylsiloxane is equilibrated with a long chain organopolysiloxane such as a dimethylpolysiloxane and the equilibrated product is finally reacted with the halogen containing heterocyclic compound in the presence of a suitable acid acceptor such as sodium carbonate, ammonium carbonate, triethylamine, or sodium bicarbonate.

Fibrous materials which may be treated with the compositions of our invention include natural and synthetic fibres and filaments and woven, knitted or felted fabrics made therefrom such as cotton, wool, regenerated cellulose, synthetic linear superpolyamides, polyacrylonitrile and polyesters such as polyethylene terephthalate. The results obtained by treatment of cellulosic materials are particularly good.

In the treatment of fibrous materials with the compositions of our invention application is carried out in conventional equipment using either a solution of the composition in an organic solvent or an aqueous emulsion thereof. Suitable organic solvents which may be used include, for example, benzene, toluene, petroleum spirits, carbon tetrachloride, trichloroethylene and the like.

The treating medium may contain the organosilicon composition in widely varying quantities, for example, from about 0.5 to about 5 percent or more by weight of the treating medium. It is, however, in general preferred to use quantities of the order of from 1 to 3 percent.

After treating the fibrous material the excess treating medium is removed, for example, by passing the fibrous material between squeeze roller and the treated fabric dried, for example, by heating. Such heating may conveniently be carried out at a temperature within the range from about 50 to about 150° C. It is however, in general preferred to heat from about 100 to about 120° C.

During the treatment of cellulosic fibres or fabrics it is, of course, normally undesirable to allow appreciable amounts of acid to build up in the fibres lest the strength be impaired. A pretreatment or a simultaneous treatment with an alkali is therefore desirable in such cases. For this purpose treatment with sodium acetate, sodium bicarbonate or other alkali is effective.

The process of treating fibrous materials with the compositions of my invention may of course be combined with other treatments such as are commonly used for improving or conferring crease resistance, improved handle or water repellancy. Such treatments include those with aminoaldehyde condensates such as urea-formaldehyde and melamineformaldehyde condensates and those with metal salts such as salts of aluminum, zirconium and titanium.

My invention is further illustrated by the following examples in which all parts and percentages are by weight.

EXAMPLE 1

85 parts of phenyldimethylchlorosilane were intimately admixed with 200 parts of water and the mixture allowed to separate into two layers. The aqueous layer was then removed and the non-aqueous layer washed with water, until it was neutral to litmus. It was then dried over calcium chloride and fractionated and the fraction distilling at 140° C.±3° C. at 0.5 mm. Hg. pressure retained. Analysis of this material gave C, 66.8 percent; H, 7.6 percent (calculated values for $C_{16}H_{22}Si_2O$ are C, 67.1 percent; H, 7.7 percent). 28.6 parts of the material so obtained were nitrated by adding it slowly to a cooled stirred mixture of 21 parts of 97 percent nitric acid and 92.5 parts of acetic anhydride. During nitration the temperature of the reaction mixture was maintained between 20° C. and 30° C. The reaction was continued for 6 hours after which the mixture was carefully poured into 130 parts of a cooled concentrated ammonium hydroxide solution (33 percent $NH_3$) mixed with ice. The mixture was then allowed to separate into two layers and the non-aqueous layer extracted with toluene, washed three times with water and dried over calcium chloride. The toluene extract was distilled, the toluene removed and the main fraction, distilling at 148°–152° C. at 0.15 mm. Hg. pressure, retained.

The nitrated product was reduced in the following manner: 12 parts of iron filing were added to 0.3 part of glacial acetic acid in 12.4 parts of water and the mixture heated to 60° C. 3.8 parts of the nitrated product were added to the hot mixture over a period of 10 minutes with continuous stirring and then stirred for a further 6 hours after which the solution was made alkaline with sodium carbonate solution. The mixture was then filtered, washed with water, and extracted with ether, after which the ether extract was treated with dilute hydrochloric acid. An oil was liberated from the aqueous layer by rendering it alkaline with sodium hydroxide solution. This oil was dissolved in ether, washed free of sodium hydroxide, dried over potassium hydroxide and finally obtained in a more pure state by removal of the ether.

3 parts of this oil were then mixed with 150 parts of octamethylcyclotetrasiloxane and 0.75 part of potassium hydroxide dissolved in 3 parts of water. The mixture was vigorously stirred and heated to 160° C. and maintained at that temperature for three hours, the water being allowed to distil off as the temperature rose. After cooling to about 20° C. 2 parts of sodium bicarbonate were added and the mixture stirred and heated to 120° C. for 30 minutes after which the solids present were removed by centrifuging. The oil remaining was dispersed in 200 parts of benzene and 3 parts of cyanuric chloride, dispersed in 50 parts of benzene, were added dropwise thereto. The mixture was heated under reflux for 2 hours and the benzene thereafter removed by distillation. Excess cyanuric chloride was removed by centrifuging the cooled mixture and there was thus obtained 145 parts of a pale yellow oil.

EXAMPLE 2

Desized cotton gabardine and viscose gabardine fabrics were treated with 0.5 percent sodium carbonate solution, dried at 120° C. for 5 minutes and then treated with a solution of 3 parts of the product of Example 1 dissolved in 97 parts of toluene, by passing the cloth through the solution and then between squeeze rollers to remove excess solution. This was followed by drying at 120° C. for 5 minutes. When the water repellency of the treated clothes was assessed by the spray test (British Standards Handbook No. 11, 1949 edition, p. 278) they were found to have a spray rating of 100. The treated fabrics were washed in 50 times their weight of a solution containing 5 parts of soap and 3 parts of sodium carbonate per 1000 parts of solution. The duration of each wash was 30 minutes and the temperature was 100° C. After six such washes the spray rating of both the cotton gabardine and the viscose gabardine was 80–90 showing that the water repellent effect was resistant to repeated severe washing.

EXAMPLE 3

21 parts of 97 percent nitric acid were slowly added to 46 parts of acetic anhydride, cooled in ice. This solution of nitric acid was added dropwise over a period of 1 hour to 56 parts of tetramethyltetraphenylcyclotetrasiloxane dispersed in 46 parts of acetic anhydride, the mixture being well stirred and cooled in ice during the addition. The cooled mixture was stirred for a further 18 hours and then 123 parts of concentrated ammonium hydroxide solution (33 percent $NH_3$) were carefully added. The mixture was then extracted with 100 parts of toluene and the toluene extract washed with water until neutral. This extract was then dried with calcium chloride and the toluene removed by distillation leaving a yellow oil. 56 parts of this oil were slowly added to a warm mixture of 6 parts of glacial acetic acid, 200 parts of water and 120 parts of iron filings. The mixture was heated, with stirring, for 16 hours, neutralised with sodium carbonate solution and filtered. The residue was dried and extracted with ether. When the ether was removed by distillation there was obtained 26 parts of a brownish oil giving, on analysis Si, 19.3 percent; N, 2.3 percent. (The theoretical values for $C_{28}H_{33}Si_4O_4N$ are Si, 20.0 percent, N, 2.5 percent.)

1 part of this oil was mixed with 40 parts of octamethylcyclotetrasiloxane and 4 parts of hexamethyldisiloxane. The mixture was stirred and 0.5 part of potassium hydroxide dissolved in 2.5 parts of water added after which the mixture was heated under reflux for 3 hours after the water had distilled off. The refluxed mixture was cooled, 2 parts of sodium bicarbonate added and the whole heated, with stirring, for 30 minutes at 120° C. It was then freed from solids by centrifuging and the oil obtained dispersed in 90 parts of benzene. To this was added 1 part of cyanuric chloride, dispersed in 10 parts of benzene and 1 part of triethylamine in 10 parts of benzene, the mixture being stirred during the addition. The mixture was heated under reflux for 1 hour and the solvent distilled off. 43 parts of a clear oil were obtained by centrifuging off the solid matter present.

This product was used to treat cotton gabardine and viscose gabardine fabrics in the manner described in Example 2 and gave highly water repellent effects which were durable to washing.

EXAMPLE 4

3024 parts of 97 percent nitric acid were intimately mixed with 12,240 parts of acetic anhydride, the mixture being cooled to 5° C. during the addition; 3432 parts of 1,3-diphenyltetramethyldisiloxane were slowly added to the mixture, the temperature being maintained below 15° C. during the addition. After a further contact time of 24 hours the mixture was added to a large excess of water (125,000 parts) and excess acid was neutralised with ammonia (neutral to litmus). The oily layer was then extracted with trichloroethylene, dried with calcium chloride and distilled. 3400 parts of a product was obtained which distilled at 170–174° C. at 0.07 mm. pressure. Analysis of this material gave C, 52.0 percent; H, 5.2 percent; Si, 14.5 percent; N, 6.6 percent (calculated values for $C_{16}H_{20}Si_2O_5N$ are C, 51.1 percent; H, 5.4 percent; Si, 14.9 percent; N, 7.4 percent).

Portions of this liquid were reduced by the following method: 3 parts of finely divided nickel (Raney nickel) prepared by dissolving nickel aluminium alloy pellets in aqueous sodium hydroxide solution and rinsing to neutrality were stirred in a reaction vessel with 100 parts of methanol and hydrogen added at 18° C. and atmospheric pressure until the catalyst was saturated. After one hour 21.4 parts of the 1,3-bis-(nitrophenyl)tetramethyldisiloxane prepared as described and 100 parts of methanol were added, the mixture stirred and hydrogen passed in. After 3 hours the hydrogen uptake ceased. The solution was thereupon dried with anhydrous sodium sulphate, filtered and the methanol removed by evaporation. 17.9 parts of a light brown oil were obtained which on distillation yielded a clear light amber oil boiling at 178° C. at 0.03 mm. Hg pressure. Analysis of this material gave C, 60.3 percent; H, 7.4 percent; Si, 18.0 percent; N, 9.0 percent. (Calculated values for $C_{16}H_{24}Si_2ON_2$ are C, 60.8 percent; H, 7.6 percent; Si, 17.7 percent; N, 8.9 percent.)

To 2000 parts of octamethylcyclotetrasiloxane were added a mixture of 10 parts of potassium hydroxide and 10 parts of water. The water was distilled off and a mixture of 20 parts of hexamethyldisiloxane and 40 parts of 1:3-bis-(aminophenyl)-tetramethyldisiloxane was slowly added with stirring. The mixture was heated under reflux to 160° C. for 6 hours then cooled to 100° C., 20 parts of sodium bicarbonate added and the mixture heated to 130° C. for 15 minutes after which it was cooled and filtered.

400 parts of the oil thus obtained were stirred with 9 parts of cyanuric chloride, 4 parts of ammonium carbonate and 192 parts of benzene at reflux temperature for 1 hour and the mixture then cooled.

20 parts of anhydrous sodium sulphate were added to the cooled mixture and the liquid filtered from solid material after 1 hour. The benzene was removed by distillation and the liquid applied to cloth as described in Example 2. Initial spray ratings of 100 were obtained as shown in the table, which also indicates the spray ratings obtained after 5 and 10 washes.

Table 1

| Cloth | Spray Rating | | |
|---|---|---|---|
| | Initial | After 5 washes | After 10 washes |
| Cotton | 100 | 80 | 80 |
| Viscose | 100 | 90 | 80 |
| "Terylene" polyester fibre cotton | 100 | 80 | 70 |
| "Fibrolane" protein fibre | 100 | 90 | 80 |
| "Tricel" cellulose triacetate fibre/"Fibrolane" protein fibre/Nylon | 100 | 80 | 70 |

What I claim is:

1. An organosilicon composition of the formula

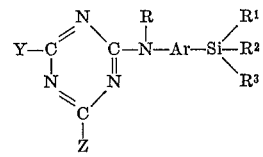

where R is selected from the group consisting of H, alkyl containing not more than 6 carbon atoms and aryl; Y and Z are selected from the group consisting of Cl, Br, I, OR′ where R′ is selected from the group consisting of alkyl, aryl, and alkenyl having not more than 6 carbon atoms, NR″$_2$ group where R″ is selected from the group consisting of H, alkyl and alkenyl having not more than 6 carbon atoms; Ar is selected from the group consisting of a phenylene group and a substituted phenylene group; $R^1$ is a triorganosilylorganosiloxanyl group and $R^2$ and $R^3$ are selected from the group consisting of alkyl, aryl and triorganosilylorganosiloxanyl groups.

2. A composition as claimed in claim 1 wherein R is hydrogen, Y and Z are chlorine atoms, Ar is phenylene, $R^1$ is a triorganosilylorganosiloxanyl group and $R^2$ and $R^3$ are methyl.

3. A composition according to claim 2 wherein $R^1$ is dimethylsiloxanyl.

4. A composition as claimed in claim 1 wherein the group R is selected from hydrogen and methyl groups.

5. A composition as claimed in claim 1 wherein Y and Z are both chlorine atoms.

6. A composition as claimed in claim 1 wherein one of the substituents Y and Z is a chlorine atom and the other is a methoxy group.

7. A composition as claimed in claim 1 wherein the group Ar is a meta-phenylene group.

8. A composition as claimed in claim 1 wherein $R^1$ is selected from dimethylsiloxanyl, methylhydrogensiloxanyl, methylphenylsiloxanyl and methylvinylsiloxanyl groups end stopped with a triorganosilyl group selected from trimethylsilyl groups, dimethylhydrogensilyl groups and dimethylphenylsilyl groups.

9. A composition as claimed in claim 8 wherein $R^2$ and $R^3$ are the same and are methyl groups.

(References on following page)

References Cited by the Examiner

UNITED STATES PATENTS

| | | | |
|---|---|---|---|
| 2,742,466 | 4/1956 | Randall et al. | 260—249.5 |
| 2,949,434 | 8/1960 | Bailey et al. | 260—249.6 X |
| 3,015,583 | 1/1962 | Vail et al. | 117—139.4 |
| 3,035,942 | 5/1962 | Cooke et al. | 117—139.4 |
| 3,074,946 | 1/1963 | Rattenbury et al. | 260—249.5 |
| 3,119,822 | 1/1964 | Engel | 260—249.5 |

WALTER A. MODANCE, *Primary Examiner.*

NICHOLAS S. RIZZO, *Examiner.*